United States Patent [19]

Antonio

[11] Patent Number: 5,193,448
[45] Date of Patent: Mar. 16, 1993

[54] CENTRIFUGAL MACHINE WITH CENTRAL FEED OF THE KIND UTILIZABLE PARTICULARLY ON THE ALIMENTARY FIELD FOR OBTAINING FRUIT OR VEGETABLES JUICES

[76] Inventor: Antonio Cimenti, Via Baron, 15 - 30027 San Dona'Di Piave, Venezia, Italy

[21] Appl. No.: 596,912

[22] Filed: Oct. 16, 1990

[51] Int. Cl.⁵ .................................. A23N 1/02
[52] U.S. Cl. .............................. 99/512; 99/513
[58] Field of Search .................... 99/511-513; 210/360.1

[56] References Cited

U.S. PATENT DOCUMENTS 5,031,522 7/1991 Brixel et al. .................... 99/513

FOREIGN PATENT DOCUMENTS

| 1080276 | 4/1960 | Fed. Rep. of Germany . |
| 786839 | 9/1935 | France . |
| 377495 | 6/1964 | Switzerland . |
| 375114 | 8/1964 | Switzerland . |
| 192291 | 2/1923 | United Kingdom . |

*Primary Examiner*—Ivars Cintins
*Attorney, Agent, or Firm*—Wenderoth, Lind & Ponack

[57] ABSTRACT

A centrifuge for alimentary uses of the kind provided with a central feeding duct, includes a pestle to be introduced in the feeding duct, provided at one end with a piurality of sharp and small projected elements adapted to engage the material to be treated as well as with a longitudinal groove on its outer surface. A pin which is connected to the feeding duct extends into the groove for allowing the pestle to slide in the feeding duct, while preventing any rotation thereof produced by the material being entrained by a rotating grater and delimiting the insertion of the pestle to a position in which the end thereof is located near the grater. Moreover, a projecting cutting element is provided on the head of the screw fixing the grater to a motor shaft, so as to effect the crumbling of the material located at the central part of the grater. The introduced end of the pestle is provided with a cavity adapted to receive the cutting element therein, so as to adequately maintain the spacing between the pestle and the grater.

14 Claims, 3 Drawing Sheets

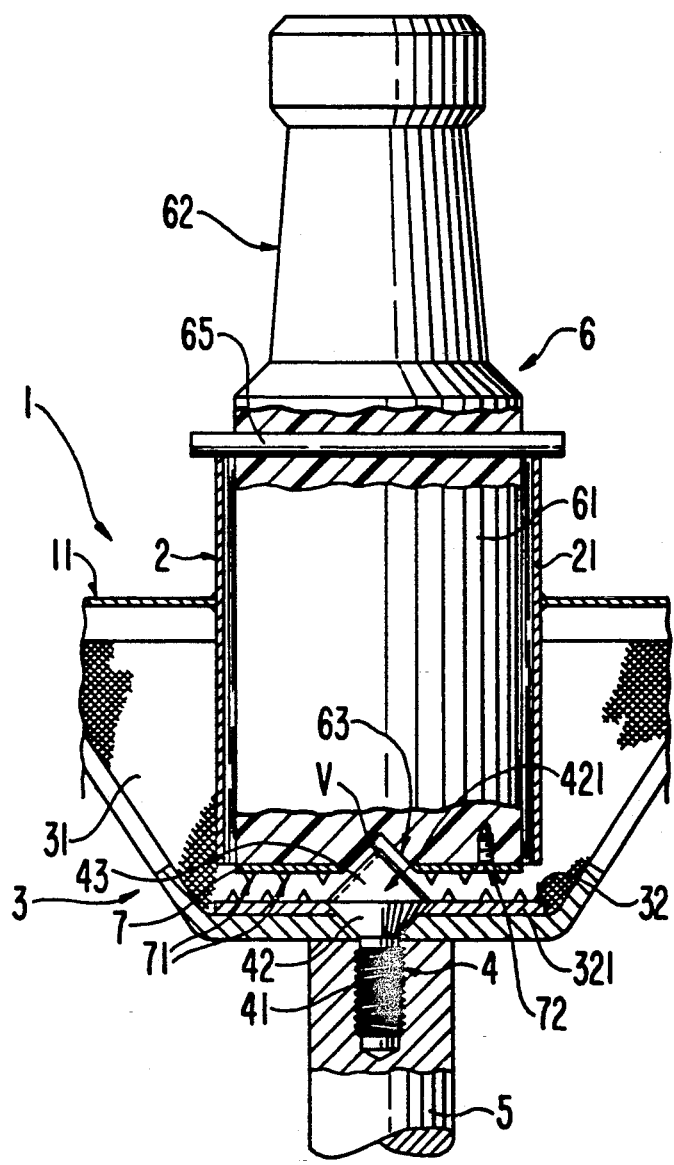

CENTRIFUGAL MACHINE WITH CENTRAL FEED OF THE KIND UTILIZABLE PARTICULARLY ON THE ALIMENTARY FIELD FOR OBTAINING FRUIT OR VEGETABLES JUICES

BACKGROUND OF THE INVENTION

The present invention relates to a centrifugal machine with central fed of the kind utilizable particularly in the alimentary field for obtaining fruit or vegetables juices. More particularly, the present invention relates to improvements in the fixing element for the unit "grater-filtering basket" of the centrifugal machine as well as to the pressing device thereof commonly called a "pestle". The pestle is employed for pushing the products to be treated in the feeding duct of such machines and permits the entire product to be introduced to a grater, with a consequent complete treatment thereof.

So-called "centrifugal machines" are well known in the alimentary field particularly for squeezing fruit and vegetables to obtain the juices thereof.

As is already known, centrifugal machines of various types have been provided with a central feed, coaxial to the working unit (grater-filtering basket) so as to be more efficient as well as smaller than other types of juice machines.

The machines provided with central feed which present different defects and operative restrictions have been progressively improved and among the most advanced and also the most recent types of machines, reference can be made to the improved machine described in utility model patent application n. 60323 B/87 filed in Italy on Feb. 27, 1987 by the present inventor.

However, in a machine of such kind, a transverse element is always provided at the lower end of the feeding duct near the upper surface of the scraping element (rotating grater). This transverse element, generally constituted by a thin lamina, is diametrically disposed with respect to said feeding duct and functions to prevent said scraping element from entraining in rotation the material (fruit or vegetables) introduced thereto.

The improvement described in the above-mentioned utility model patent application consists of providing an upset "V" groove in the surface provided at the pressing end of the pestle, in which groove said transverse element may extend so as to permit an almost complete penetration of the material to be worked.

This solution too, however, presents functional restrictions and drawbacks.

In fact, if pieces of fibrous products with ligneous consistency, such as carrots and the like, become oriented with their fibrous part extending transversely to said transverse element, the working thereof is difficult and often is performed in an incomplete way even when considerable thrusts are exerted on the pestle, which thrusts, however, cause a considerable fatiguing of the operator.

SUMMARY OF THE INVENTION

An object of the present invention is to prevent such drawbacks and this object is obtained according to the present invention by a unit for introducing the material to be treated, characterized in that the head of the screw used for fixing the rotating unit "grater-filtering basket" to the centrifuge motor shaft has a cutting element projecting therefrom centrally of the working surface of the grater. The sides of said cutting element define cutting edges. Furthermore, the terminal end surface of the introduced end of the pestle is provided with a plurality of small projected elements, preferably sharpened, and adapted to engage the parts of the material to be treated. The pestle is also provided with stopping means adapted to position it in the feeding duct, so that its introduced end is situated near said grater. Finally, said pestle and said feeding duct are preferably provided with antirotation and locking elements constituting the stopping means, which cooperate for slidably guiding said pestle in the associated feeding duct while preventing it at the same time from being rotated due to the rotation of the material being worked which is entrained by the rotating grater, as well as for limiting the insertion of the pestle into said feeding duct to the position at which the terminal end surface is near said grater.

BRIEF DESCRIPTION OF THE DRAWINGS

In order to better understand the characteristics and advantages of the present invention, the invention will be hereinafter described in more detail, in a preferred embodiment thereof by way of a not-limitative example, with reference to the accompanying drawings in which:

FIG. 3 is a view similar to FIG. 1, of another embodiment of the present invention;

DETAILED DESCRIPTION OF THE PREFERRED EMBODIMENTS

Figure 1:
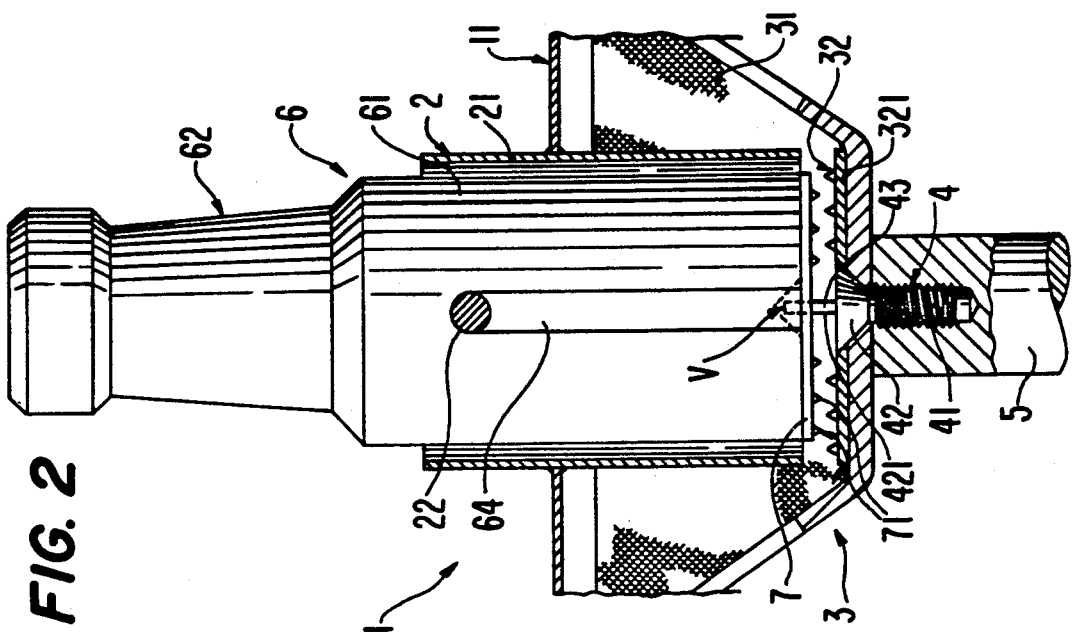
FIG. 1 is a longitudinal view, partially in section, of part of the head of a centrifuge machine provided with elements according to the present invention.
Figure 2:
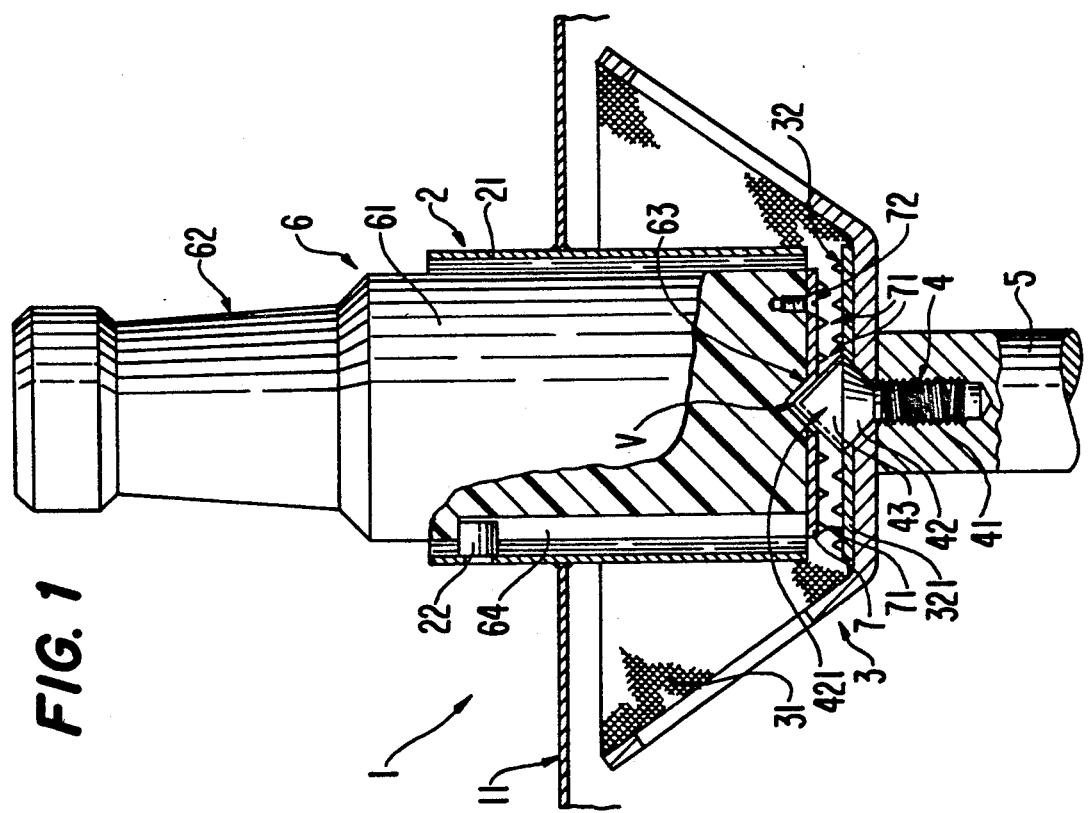
FIG. 2 is a longitudinal view, taken along a plane diametrically orthogonal to that of FIG. 1 and partially in section.

With particular reference to FIGS. 1 and 2, part of the head 1 of a centrifuge of the kind referred to, includes a feeding duct 2 formed by a cylindrical tubular portion 21 connected to support structure 11 of the head 1, a rotating working unit 3 formed of a filtering basket 31 and a grater 32 constituted by an upper indented disc 321, a fixing element 4 for fixing said rotating working unit 3 to the upper end of a motor shaft 5, and a pestle 6 constituted by a cylindrical body 61 having a suitable length slidably insertable in said feeding duct 2 and by an upper handgrip 62 constituted by an appropriately shaped part.

All of the elements so far referred to are conventional in the centrifuges to which reference has been made. On the contrary, the present invention is different from conventional centrifuges in the following points.

The fixing element 4, which is always constituted by a screw 41, has a head 42 and a projecting cutting element 421 that, as shown in FIGS. 1 and 2, is constituted by a triangular plate 43 disposed diametrically of the same head 42 and which extends therefrom. The upper vertex of the plate 43 is coaxial to the screw 41 so as to lie along the central longitudinal axis thereof.

Figure 4A:
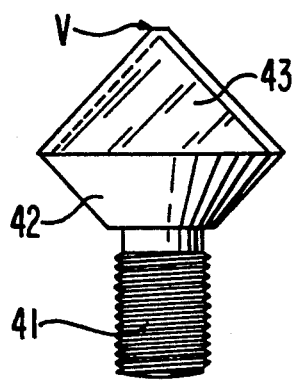
FIGS. 4(a)-4(c) are front, side and plan views of a cutting element and integral screw for fixing the rotating unit "grater-filtering basket" to a motor shaft according to the present invention.
Figure 4B:
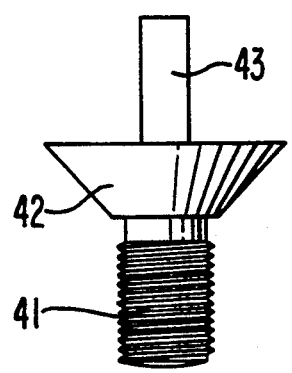
Figure 4C:
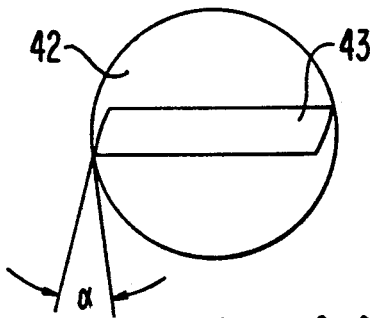

Moreover, as is clearly shown in FIG. 4, the sides of such rectangular plate 43 are adequately beveled thus provided a rake a and sharp working corners.

The end of the pestle 6 in the feeding duct 2 is provided with an indented discoidal plate 7 fixed by means of screws 72 and from the outer surface of which extend a plurality of small and sufficiently sharp projected elements 71. The plate 7 may thus form the terminal end surface of the pestle 6.

Furthermore, at the center of said discoidal plate 7 is a hole which extends into the corresponding end of the cylindrical body 61 of the pestle 6, forming a conic cavity 63 adapted to permit, as described hereinafter, the insertion of the projected part 421 provided on said head 42 of the fixing screw 41 therein.

In addition, a longitudinal groove 64 is provided in the cylindrical body 61 of said pestle 6, in which groove is received a pin 22 connected to the feeding duct 2 near its upper end and projecting toward the inside thereof.

Said groove 64 is formed to such an extent that, when the pestle 6 is introduced in the feeding duct 2, said pin 22 abuts a surface of the cylindrical body 61 defining a terminal portion of the groove 64, thereby locating the pestle 6 at such a position that its introduced end, provided with said indented discoidal plate 7, is adequately and slightly spaced from the indented disc 321 forming said grater 32.

The present invention operates as follows.

When the centrifuge is put into operation, the working unit 3, i.e. the "grater-filtering basket", is rotated as driven by the shaft 5 to which a motor is connected.

Then, the material to be treated is introduced to the feeding duct 2 and the pestle 6 is used to push the material against the grater 32. The pestle 6 is inserted into the feeding duct 2 with the pin 22 received in the groove 64.

When the material contacts the grater 32, the material is crumbled by the teeth thereof which at the same time, however, entrain the material during the rotation thereof. When the pressing surface of the pestle 6 provided with said indented discoidal plate 7 bears against the material being worked, the teeth 71 of the discoidal plate 7 engage the mass of material and prevent the same from being rotated, as discussed above, by the rotation of the grater 32 because the pestle 6 is clearly prevented from rotating by the pin 22 extending into the groove 64.

However, a practically inactive working zone would be formed at the material being worked, which would be inconvenient.

On the contrary, the above-described triangular plate 43 on the head 42 of the fixing screw 4 makes it possible for the material at the central zone of the grater 32 to undergo an effective and complete crumbling.

In fact, the cutting corners at the sides of said triangular plate 43 progressively and completely cut the material up to the center of the plate, so eliminating any inactive zone. When the pestle 6 is inserted within feed duct 2 with its lower pushing surface disposed near the grater 32, the pin 22 bears against a surface of cylindrical body 61 defining the upper end of the groove 64. Thus, the pestle 6 is stopped so as to prevent any further advancing thereof and therefore discoidal plate 7 will not impact against the grater 32.

In such a position, the triangular plate 43 would abut against the lower pushing surface of the pestle 6; however, as already stated, a conic cavity 63 is provided in the end of the pestle 6 so as to space the pestle 6 slightly from the triangular plate 43 thus preventing any contact therebetween.

It is to be noted that the projected part 421 provided on the head 42 of the fixing screw 4 which, as described previously by way of example, is triangular, may have other different equivalent shapes. For instance, it may be constituted by a semi-discoidal plate 44 as illustrated in FIG. 5 or by a pyramidal element 45 as illustrated in FIG. 6.

Figure 6A:
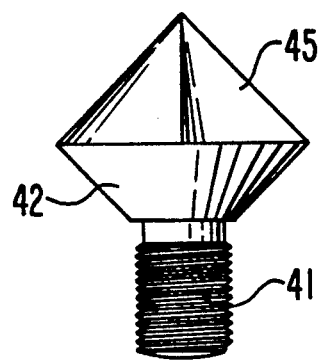
FIGS. 6(a) and (b) are side and plan views of still another cutting element.
Figure 5A:
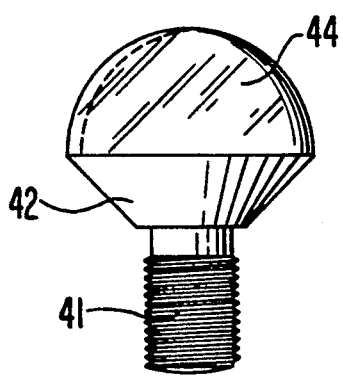
FIGS. 5(a)-5(c) are front, side and plan views of another form of the cutting element.
Figure 5B:
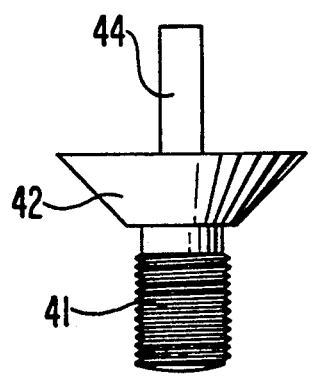
Figure 6B:
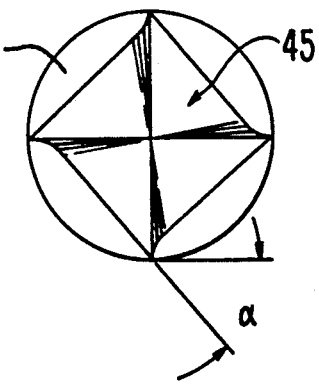
Figure 5C:
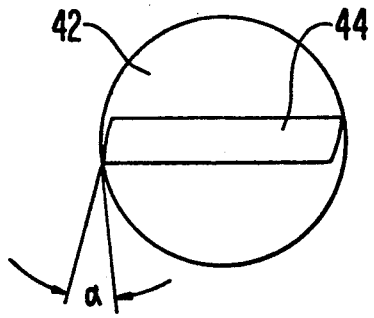

As clearly illustrated in FIGS. 5 and 6, in these different parts, the sides impacting the material to be treated always form a suitable rake a.

Also the above-described elements for slidably guiding the pestle 6 to prevent it from being entrained in rotation as well as the elements for stopping its introduction into the feeding duct 2 may take the form of other equivalent elements.

It is to be noted additionally that, from tests effected in practice, the material entrained by the rotating grater 32 exerts a very limited force on the pestle 6, so that a very limited counterforce was sufficient for preventing the same from being rotated.

In practice, the simple force exerted by the operator's hand during the progressive insertion of the pestle 6 into the feeding duct 2 is enough for preventing, without effort, even limited rotation of the pestle 6.

Therefore, it follows that in practice a simple means is sufficient for stopping the introduction of the pestle 6 into said feeding duct 2 and for stopping said pestle when its introduced end arrives near said rotating grater 32.

Therefore, in another embodiment as illustrated in FIG. 3, the pestle 6 is simply provided with a cylindrical rod 65 near the upper end of its cylindrical body 61, which rod extends diametrically thereof, transverse to said cylindrical body 61 and is irremovably connected thereto. The ends of the rod 65 project from the cylindrical body 61 in such a way that when bearing against the upper edge of said feeding duct 2, the rod 65 delimits the insertion of the pestle 6 into the same feeding duct, while stopping it when the introduced end thereof arrives near the grater 32.

In another embodiment, a simple peripheral rim could project from the cylindrical body at the same position of transverse cylindrical rod 65.

Finally, it is well understood that different variants may be brought to the invention referred to, however, without departing from the scope of what is described and hereinafter claimed and therefore from the field of protection of the present industrial invention.

I claim:

1. A centrifugal apparatus for obtaining fruit or vegetable juices, said apparatus comprising:
    a rotating unit including a basket and a grater located on a bottom surface of said basket so as to define a working surface at the bottom of said basket;
    a motor shaft supported for rotation in the apparatus;
    a screw fixing said rotating unit to said motor shaft, said screw having a screw head and a cutting element projecting from said screw head centrally of the working surface defined by said grater, said cutting element having sides defining cutting edges;
    a pestle having a terminal end surface provided with a plurality of sharp elements;
    guide means for introducing food material to said grater and for receiving and slidably guiding said pestle in an insertion direction toward the working surface of said grater, said guide means comprising a feeding duct fixed in position in the apparatus coaxially to said rotating unit, and said feeding duct having one end open to the bottom of said basket whereat said working surface is defined such that food material fed into said feeding duct can be pushed toward said working surface by the terminal end surface of said pestle with the pestle being guided by said feeding duct in said insertion direction; and stopping means for limiting the insertion of said pestle in said feeding duct to an inserted position at which the terminal end surface of said pestle is spaced over and adjacent the working surface defined by said grater.

2. A centrifugal apparatus as claimed in claim 1, wherein said stopping means also prevents rotation of said pestle relative to said feeding duct when said pestle is at said inserted position.

3. A centrifugal apparatus as claimed in claim 2, wherein said cutting element is a triangular plate having one side thereof extending diametrically of the head of said screw, a vertex of said triangular plate being disposed over the head of said screw along the central longitudinal axis of said screw, and the other sides of said triangular plate defining said cutting edges, respectively, and being beveled from said cutting edges so as to define rakes thereat.

4. A centrifugal apparatus as claimed in claim 2, wherein said cutting element is a semi-circular disc extending diametrically of the head of said screw, the arcuate peripheral surface of said semi-circular disc defining said cutting edges.

5. A centrifugal apparatus as claimed in claim 2, wherein said cutting element is pyramidal so as to have a plurality of intersecting side surfaces, said cutting edges being defined at locations at which said side surfaces intersect.

6. A centrifugal apparatus as claimed in claim 2, wherein said pestle has a cavity extending therein from the terminal end surface of said pestle, the cutting element being received in said cavity but being spaced from said pestle when said pestle is in said inserted position.

7. A centrifugal apparatus as claimed in claim 2, wherein said pestle includes a tubular body and a discoidal plate fixed to said tubular body at one end thereof so as to form the terminal end surface of the pestle, said discoidal plate including a plurality of sharp projections constituting said sharp elements.

8. A centrifugal apparatus as claimed in claim 1, wherein said cutting element is a triangular plate having one side thereof extending diametrically of the head of said screw, a vertex of said triangular plate being disposed over the head of said screw along the central longitudinal axis of said screw, and the other sides of said triangular plate defining said cutting edges, respectively, and being beveled from said cutting edges so as to define rakes thereat.

9. A centrifugal apparatus as claimed in claim 1, wherein said cutting element is a semi-circular disc extending diametrically of the head of said screw, the arcuate peripheral surface of said semi-circular disc defining said cutting edges.

10. A centrifugal apparatus as claimed in claim 1, wherein said cutting element is pyramidal so as to have a plurality of intersecting side surfaces, said cutting edges being defined at locations at which said side surfaces intersect.

11. A centrifugal apparatus as claimed in claim 1, wherein said stopping means is a rod extending transversely of and fixed to said pestle, said rod having a length greater than the diameter of the other end of said feeding duct so as to bear thereagainst when said pestle is in said inserted position.

12. A centrifugal apparatus as claimed in claim 1, wherein said stopping means is a rim extending around the periphery of said pestle, said rim having an outer diameter greater than the diameter of the other end of said feeding duct so as to bear thereagainst when said pestle is in said inserted position.

13. A centrifugal apparatus as claimed in claim 1, wherein said pestle has a cavity extending therein from the terminal end surface of said pestle, the cutting element being received in said cavity but being spaced from said pestle when said pestle is in said inserted position.

14. A centrifugal apparatus as claimed in claim 1, wherein said pestle includes a tubular body and a discoidal plate fixed to said tubular body at one end thereof so as to form the terminal end surface of the pestle, said discoidal plate including a plurality of sharp projections constituting said sharp elements.

* * * * *